June 24, 1969   C. S. McNULTY   3,451,259
APPARATUS AND METHODS FOR TESTING CONDUITS
Filed July 28, 1967   Sheet 1 of 3

INVENTOR.
CARRELL S. McNULTY
BY
Brumbaugh, Free, Graves & Donohue
his ATTORNEYS

INVENTOR.
CARRELL S. McNULTY
BY
Brumbaugh, Free, Graves & Donohue
his ATTORNEYS

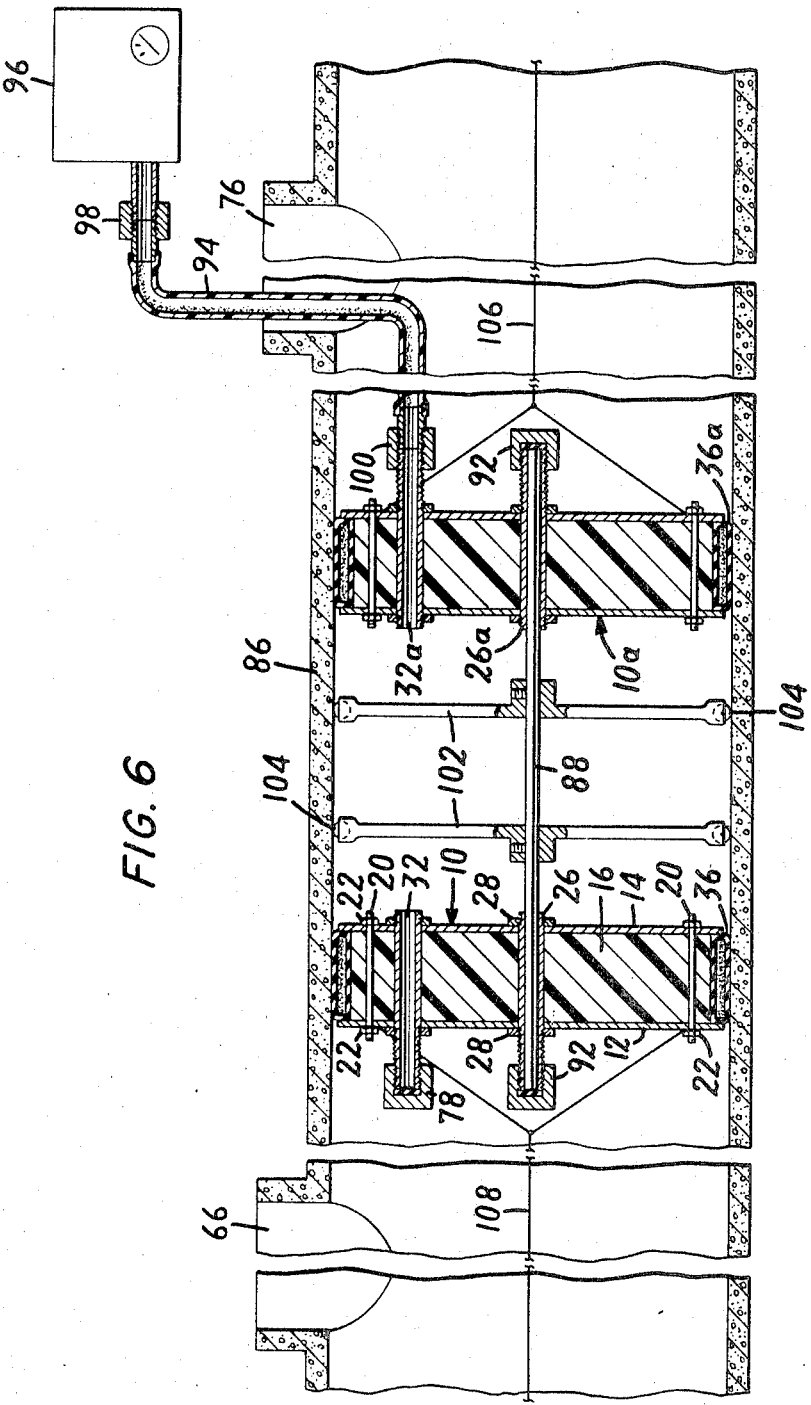

United States Patent Office 3,451,259
Patented June 24, 1969

3,451,259
APPARATUS AND METHODS FOR TESTING CONDUITS
Carrell S. McNulty, 35 Beulah Road,
New Britain, Pa. 18901
Filed July 28, 1967, Ser. No. 656,919
Int. Cl. G01m 3/08
U.S. Cl. 73—40.5   9 Claims

ABSTRACT OF THE DISCLOSURE

This invention describes apparatus and methods for testing a portion of a conduit by blocking each end of the passageway of the conduit portion with a disc. Each of the discs has a plurality of pluggable openings therethrough which provide access to the passageway for any equipment required during the testing. Infiltration, exfiltration or air pressure tests may be run by (a) properly positioning the discs within the conduit, (b) plugging the appropriate openings through the discs, and (c) connecting any equipment appropriate for the particular test desired to the passageway of the conduit through any unplugged disc openings.

Background of the invention

This invention relates to apparatus and methods for testing conduits. More particularly, it relates to apparatus and methods for testing the degree of imperviousness of conduits.

It is often necessary in the design, construction or maintenance of a conduit system, such as a sewer, to test the individual conduits of the system. A number of different tests may be performed upon the conduits which give useful indications as to the degree of their imperviousness and thus to the amount of their expectable leakage. The most useful and common of these are tests by infiltration (determining the rate at which liquid seeps into a conduit), exfiltration (determining the rate at which liquid seeps out of a conduit), and air pressure (determining the ability of a conduit to maintain air therein). Heretofore testing by exfiltration and infiltration has been limited to conduit portions through which there is an opening, e.g. a man hole (hereinafter and in the claims to be called an entrance opening) so that access therethrough to the passageway of the conduit portion may be had for external gauges and/or other test equipment. Furthermore, to test a conduit by air pressure, specialized equipment has been required which is not adaptable for testing by infiltration or exfiltration.

Summary of the invention

It is an object of the present invention to provide conduit testing apparatus and methods which may be readily adapted to test either a portion of conduit having an entrance opening therethrough or a portion of conduit between two entrance openings;

Another object of the present invention is to provide conduit testing apparatus and methods which may be readily adapted to test a portion of conduit either by infiltration, exfiltration or air pressure.

The above and other objects are obtained in accordance with the invention by providing at least one disc, suitable for blocking the passageway of a conduit, having a plurality of pluggable openings therethrough. The disc is utilized to block the portion of the conduit under test, and the openings therethrough provide access to the passageway when such access is not provided by an entrance opening. Any or all of the openings through the disc may be plugged when not required for a particular test. The apparatus may easily be adapted for testing by infiltration, exfiltration or air pressure, simply by properly positioning the disc within the conduit, plugging the appropriate holes through the disc, and by connecting any equipment appropriate for the particular test desired to the passageway of the conduit through any unplugged disc openings.

Brief description of the drawings

For a better understanding of the present invention, reference may be made to the accompanying drawings in which:

FIGURE 6 is a cross sectional view along the length of a conduit being tested by air pressure with apparatus in accordance with the present invention.

Description of the preferred embodiments

Figure 1:
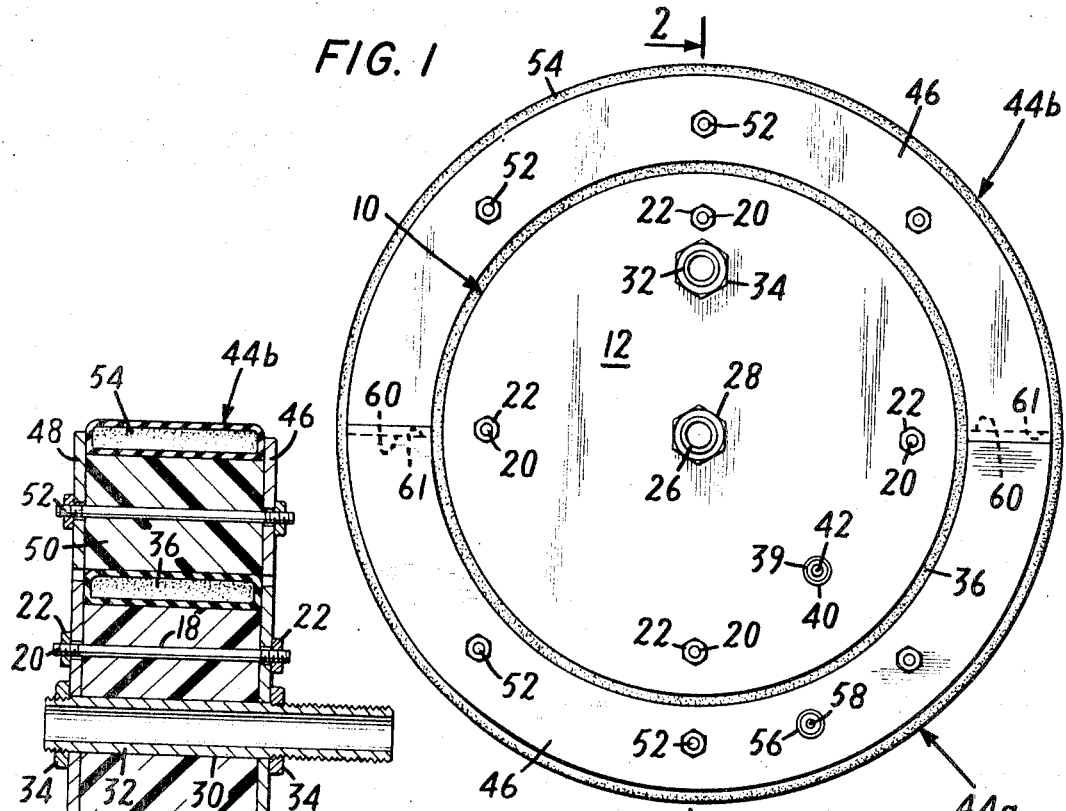
FIGURE 1 is an elevational view of the front of a disc and sectional adapter utilized in accordance with the present invention.
Figure 2:
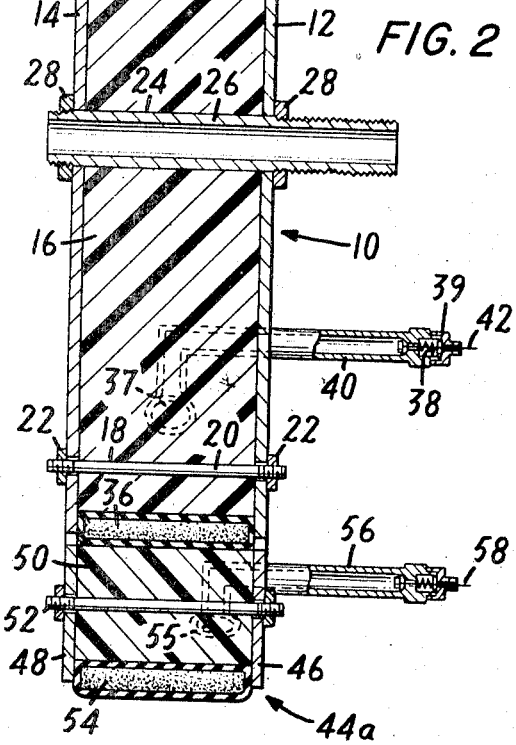
FIGURE 2 is a cross sectional view of the disc and adapter taken along lines 2—2 of FIGURE 1.

The disc 10 shown in FIGURES 1 and 2 comprises a circular front plate 12, a coaxial rear plate 14, and a coaxial cylindrical spacer block 16 between the front and rear circular plates. A plurality of bores 18 pass through the plates 12 and 14 and the spacer 16, each of which accommodates a tie bar 20 extending through the bore from one end of the disc to the other. The tie bars 20 serve to hold the front and rear circular plates and the spacer 16 in their proper relative positions, and are held within the bores 18 by nuts 22 threaded to each end of each tie bar and tightened against the outer surfaces of the plates 12 and 14. A bore 24 through the center of the disc accommodates a hollow pipe 26 which extends through the rear plate 14, the spacer 16, and the front plate 12 so as to protrude substantially from the front of the disc. The pipe 26 is held within the bore 24 by nuts 28 which are threaded to each end of the pipe 26 and tightened against the outer surfaces of the plates 12 and 14. Another bore 30, similar to bore 24, passes through the disc 10 near the periphery of the spacer 16 and accommodates a hollow pipe 32, identical to pipe 26. The pipe 32 also protrudes substantially from the outer surface of the front plate 12 and is held within the bore 30 by nuts 34 threaded to each of its ends and tightened against the outer surfaces of the plates.

The diameter of the plates 12 and 14 are equal, and exceed the diameter of the cylindrical spacer 16 so that a circular channel within the side wall of the disc 10 is formed by the plates and the cylindrical surface of the spacer. An annular inflatable gasket 36 is accommodated within this channel which when inflated fills the channel and extends outwardly therefrom. Typically, each of the circular plates 12 and 14 are 17½ inches in diameter and ¼ of an inch wide, while the spacer 16 is 16½ inches in diameter and 4 inches long. Preferably, the inflatable gasket 36 extends ¼ of an inch beyond the periphery of the plates 12 and 14 whereby the diameter of the typical disc 10 (when the gasket is inflated) is 18 inches.

To inflate the gasket 36 a bore 38 through the plate 12 and a portion of the spacer 16 extends to an air opening 37 through the inner surface of the gasket 36. A tube 40, connecting the air opening of the gasket 36 to an air hose fitting 39 in front of the disc, extends through the bore 38. A valve 42 in the accessible end of the tube 40 allows air to be pumped into the gasket 36 while preventing air from escaping therefrom.

Figure 3:
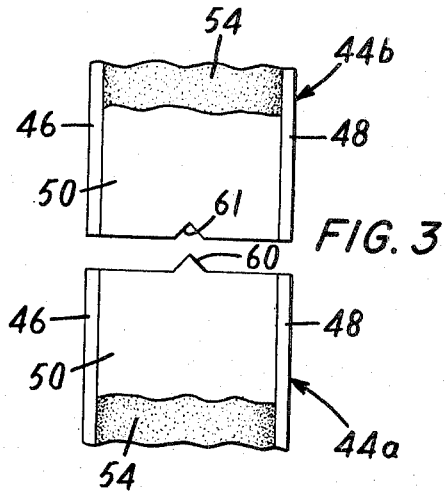
FIGURE 3 is a partial side elevational view of the adapter showing the tongue and groove coupling of its sections.

Preferably, all of the discs utilized in this invention are of a standard diameter, such as 18 inches, for use within a standard conduit. If it is desired to block a conduit having a larger diameter, a standard disc may be effectively enlarged with a sectional adapter as shown in FIGURES 1, 2 and 3. The adapter shown in these figures is comprised of two mating semiannular sections 44a and 44b which combine to form a disc having an opening therethrough within which the disc 10 is accommodated. The sections are aligned, and water is prevented from flowing between them by means of a tongue 60 (FIGURE 3), extending diametrically across the diametral surface of the section 44a, engaging with a mating groove 61, in the diametral surface of section 44b, when the sections are combined.

Each of the sections 44a and 44b comprises a front semiannular plate 46, a coaxial rear semiannular plate 48, a coaxial semiannular spacer block 50 between the semiannular plates, and a plurality of tie bars 52 holding the plates and spacer together. When the sections are combined, an inflatable annular gasket 54 fits within a circular channel within the outer curved sidewall of the adapter, similar to the channel within the sidewall of the disc 10, and when inflated extends beyond the periphery of the semiannular plates. Like the gasket 36, the gasket 54 is inflated through a tube 56 which passes through an opening in the front plate 46 to an air opening 55 of the gasket 54, and a valve 58 permits air to flow into the gasket 36 only.

The width of the adapter and the diameter of the bore within which the disc 10 is accommodated are equal to the width and diameter, respectively, of the disc 10. Thus, when the gasket 36 is inflated, a seal between the disc 10 and the adapter is formed. A set of adapters may be provided, with each adapter in the set having a different outer diameter. Then, the adapter suitable for use is that having a diameter such that the gasket 54, when inflated forms a seal with the conduit being tested. Preferably, the gasket 54 extends ¼ of an inch beyond the periphery of the plates 46 and 48 when this seal is formed.

Many materials may be suitably used to form the disc 10 and adapter sections 44a and 44b. It is preferable that all of the materials selected for such use be impervious to liquid and air, although it is sufficient if either the plates or the spacers are made from impervious materials. For example, the plates 12, 14, 46 and 48 may be made of aluminum, and the spacers 10 and 50 may be made of a dense closed cell plastic. The inflatable gaskets 36 and 54 are preferably made from an elastomeric material such as rubber. The tie bars 20 and 52, the pipes 26 and 32, and the tubes 40 and 56, may all be made from aluminum or another metal and are fitted with gaskets, where they pass through openings in the plates, suitable to prevent the flow of liquid between them and the plates.

Figure 4:
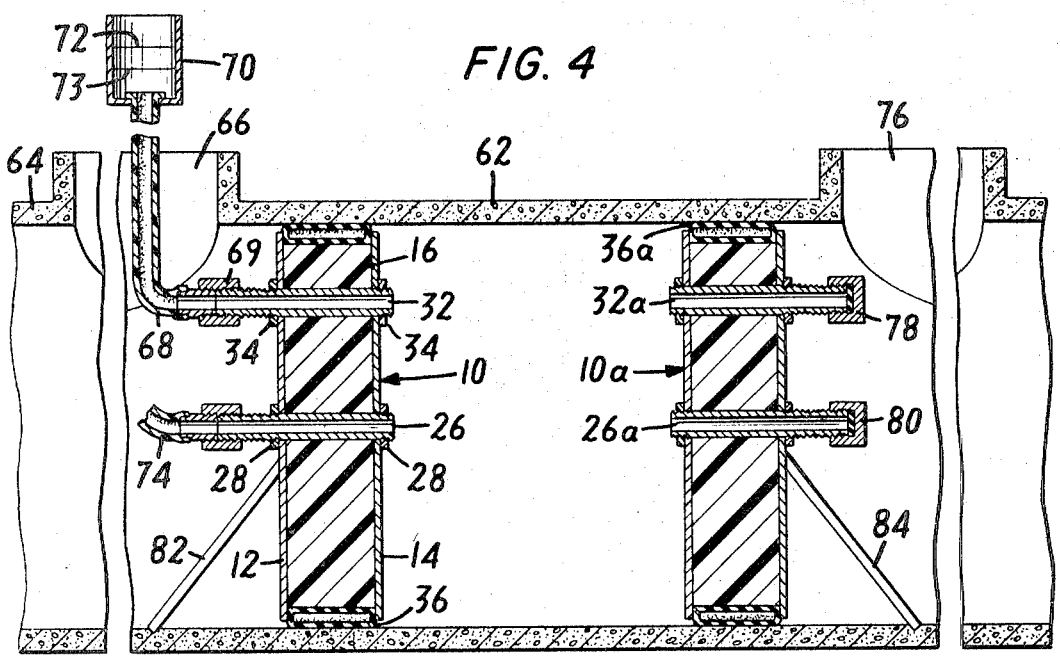
FIGURE 4 is a cross sectional view along the length of a conduit being tested by exfiltration in accordance with the present invention.

Referring to FIGURE 4, a portion 62 of a conduit 64, between two adjacent entrance openings 66 and 76, may be tested by exfiltration with the disc 10, and another disc 10a identical thereto. The disc 10 is placed within the conduit 64 near the entrance opening 66 with its axis approximately colinear to that of the conduit 64 and with the rear plate 14 facing the portion 62. The gasket 36 is then inflated so that a seal is formed between the inside of the conduit 64 and the sidewall of the disc spacer 16. A hose 68 is connected at one end to the front of the pipe 32 by means of a threaded coupling 69 attached at that end of the hose 68. The hose 68 extends through the entrance opening 66 and through an opening in the bottom of a container 70 forming a seal between the container hole and the outside of the hose 68. The container 70 has a high level mark 72 and a low level mark 73 around the walls thereof which are spaced so that the container holds a specified volume, e.g., one gallon, between them. Another hose 74 is connected to the front end of the pipe 26 in the same manner as the hose 68 is connected to the pipe 32, and is connected at its other end (not shown) to a source of water, such as a water pump.

The disc 10a is similarly placed within the conduit 64 near the entrance opening 76. The gasket 36a of disc 10a corresponding to the gasket 36 of disc 10 is inflated so that a seal is formed between the inner surface of the conduit 64 and the disc 10a. A gasketed cover 78 is threaded on to the front end of the pipe 32a (corresponding to the pipe 32 of disc 10) which prevents liquid from passing through the pipe 32a. Similarly, a gasketed cover 80 is threaded on to the front end of the pipe 26a (corresponding to the pipe 26 of disc 10) which prevents liquid from passing through the pipe 26a. In this manner, the passage of the conduit portion 62 is blocked at both ends. Beams 82 and 84, or the like, may be propped against the front plates of disc 10 and 10a, respectively, to prevent pressures from within the conduit portion 62 from pushing the discs from their proper positions during the test by exfiltration.

In performing the test by exfiltration, water is supplied from the source of water through the hose 74 and the pipe 26 to the passageway of the conduit portion 62. The water continues to be supplied until it overflows from the passageway through the pipe 32 and hose 68, and fills the container 70 to a level above the high level mark 72. The water supply to the passageway is then cut off, and a valve (not shown) either in the hose 74 or at the water source, prevents the water within the passageway from draining out through the hose 74. After the water supply is cut off, the water level within the container 70 falls as the water exfiltrates from the passageway of the conduit portion 62, and the fall from the high level water mark 72 to the low level water mark 73 is timed to determine the rate of exfiltration.

Figure 5:
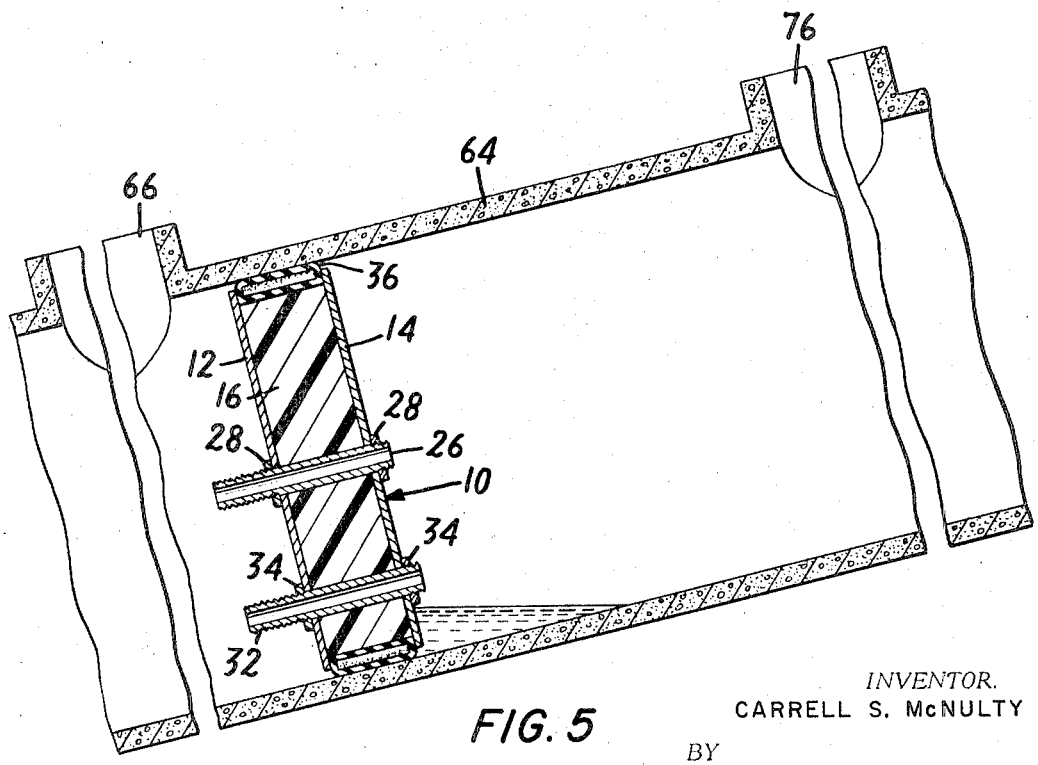
FIGURE 5 is a cross sectional view along the length of a conduit being tested by infiltration in accordance with the present invention.

The conduit 64 is shown in FIGURE 5 with its gradient greatly exaggerated for illustrative purposes. Referring thereto, the portion of the conduit 64 upstream of the entrance opening 66 may be tested by infiltration with the disc 10. The disc 10 is positioned just upstream of the entrance opening 66, and the gasket 36 is inflated thereby forming a seal. As when testing by exfiltration, the disc and conduit axis are colinear, and the rear plate 14 faces the portion to be tested. However, to test by infiltration, the disc 10 is positioned so that the distance between the invert (the lowest line extending along the length of the inner surface of the conduit 64) and the pipe 32 is minimal.

In performing the test by infiltration, the pipe 32 is left uncovered and nothing is connected thereto. Liquid infiltrates into the portion of the conduit 64 upstream of the disc 10 and rises against the rear plate 14 until it overflows through the pipe 32 and out the front thereof. The time that it takes the liquid to overflow in this manner is measured by observing when the liquid emerges from the front of the pipe 32. The distance between the invert and pipe 32 is either known because in accordance with a specific design of the disc 10, or may be easily measured. This distance together with the time measured provide information as to rate of liquid infiltration into the conduit section upstream of the disc 10.

Tables may be provided having the rate of infiltration calculated for various overflow times and conduit gradients based upon a specified distance between the pipe 32 and the invert. If it is desired to determine the rate of infiltration of a particular portion of the conduit 64, upstream of the disc 10, the disc 10a is positioned at the upstream end of that particular portion so as to block any liquid infiltration into other portions from flowing into the conduit portion under test.

Referring to FIGURE 6, portions of the conduit between adjacent entrance openings may be tested by air pressure within the discs 10 and 10a positioned at each end of a tie bar 88. The tie bar 88 extends from the front end of the pipe 26, through the pipes 26 and 26a, to the front end of the pipe 26a. Gasketed coupling covers 92 are threaded to the front ends of the pipes 26 and 26a to seal the pipes 26 and 26a and to fasten the discs to each end of the tie bar. A plurality of posts 102 are clamped to the tie bar 88 and extend perpendicularly therefrom. Each of the posts has a concave end which accommodates a ball-bearing 104 rollably therein. The length of the posts 102 and the size of the bearings 104 are such that the distances between the tie rod 88 and the most distant point on each of the bearings are equal to the radius of the conduit passageway. A tie line 108 is fastened to the plate 12 by a plurality of the nuts 22, and another tie line 106 is similarly fastened to the front plate of the disc 10a.

To test a portion 86 between the entrance openings 66 and 76 by air pressure, the disc and tie-bar assembly is placed in the conduit through the entrance opening 76 and positioned in the conduit 64 with the ball-bearings 104 contacting the inner surface thereof. To enable the assembly to be positioned in this manner, the length of the tie-bar 88 must be limited, preferably, to the diameter of the entrance opening 76. After the assembly is placed in the conduit 64, an air pump and gauge unit 96 is connected to the volume between the discs through an air hose 94. The hose 94 is connected at one end to the front of the pipe 32 or 32a, whichever is further from the entrance opening 66, and at its other end to the air pump and gauge unit 96, by means of threaded couplings 98 and 100 attached to either end of the hose 94. The pipe 32 or 32a, whichever is not connected to the hose 94, is covered by the gasketed cover 78. Then the tie line 106 or 108, whichever is closer to the entrance opening 66, is floated or thrown to a position within the conduit near the entrance opening 66. With the ball-bearings 104 as runners, the assembly is then pulled by the tie lines through the conduit to a position where the portion 86 to be tested is between the discs 10 and 10a. Then the gaskets 36 and 36a are inflated to form a seal between the discs and the conduit.

In performing the test by air pressure, air is pumped from the unit 96 through the hose 94 into the volume between the discs 10 and 10a until the air pressure therein reaches a specified value. The time required for the air pressure to decrease to a lower specified value is then measured by observing the gauge on the unit 96, thereby determining the rate of air pressure decrease within the portion 86 of the conduit between the discs. Typically, air is pumped into the conduit portion 86 until the air pressure therein reaches 4 pounds per square inch and the air gauge is observed to determine the time it takes for the pressure to decrease from 3.5 pounds per square inch to 2.5 pounds per square inch. If the portion 86 of the conduit under test is defective, the air pressure decreases relatively rapidly indicating excessive leakage through the conduit wall. After a conduit portion has thus been tested, the gaskets 36 and 36a are deflated, and the assembly may be pulled by the tie-lines either to another conduit portion to be tested, or to an entrance opening and removed from the conduit.

From the foregoing, it is seen that conduit portions between entrance openings may be tested by exfiltration, infiltration, or air pressure, by simple adaptations and/or positioning of one or two of the discs of my invention. It is to be understood that such discs may also be utilized to test a conduit portion having an entrance opening therethrough by blocking each end of the portion to be tested with a disc having its pipes covered, and by then testing by infiltration and/or exfiltration in accordance with methods heretofore known.

Although the discs and adapter of the embodiments described above are comprised of plates, spacers, and pipes, discs and adapters of other embodiments of the invention may be differently constructed. For example, one piece plastic discs and adapters may be utilized having the gasket channels and pluggable disc openings molded therein. Also, in other embodiments of the invention, the number and position of the plurality of pluggable openings may be varied to accommodate modifications in any external test apparatus utilized. Furthermore, although the adapter described consists of two sections, it may be comprised of any number of mating sections. These and other modifications may be made by those skilled in the art without departing from the spirit and scope of the invention. Accordingly, all such variations and modifications are intended to be within the scope of the invention.

I claim:

1. Apparatus for testing a portion of a conduit comprising at least one disc suitable for blocking the conduit at one end of the passageway of the conduit portion, the disc having first and second pluggable openings therethrough to provide access to the passageway when the access is required for the testing and the conduit portion does not have an entrance opening therethrough, the disc having a curved sidewall with a circular channel therein, an annular inflatable gasket disposed in the circular channel for providing a seal between the disc and the conduit, the inflatable gasket filling the channel and extending outwardly therefrom when inflated, fitting means in each of the first and second pluggable openings suitable for coupling hoses to each of the pluggable openings, first hose means adapted to be coupled at one end to the fitting means in the first opening and at its other end to means for pumping liquid, a container with a high level mark and a low level mark on the walls thereof, the container having an opening through its bottom, and second hose means adapted to be coupled at one end to the fitting means in the second opening and at its other end to the opening in the bottom of the container.

2. Apparatus for testing a portion of a conduit comprising at least one disc suitable for blocking the conduit at one end of the passageway of the conduit portion, the disc having first and second pluggable openings therethrough to provide access to the passageway when the access is required for the testing and the conduit portion does not have an entrance opening therethrough, the disc having a curved sidewall with a circular channel therein, an annular inflatable gasket disposed in the circular channel for providing a seal between the disc and the conduit, the inflatable gasket filling the channel and extending outwardly therefrom when inflated, fitting means in each of the first and second pluggable openings suitable for coupling hoses to each of the pluggable openings, a second disc suitable for blocking the conduit at the end of the passageway of the conduit portion opposite said one end of the passageway, the second disc having first and second openings therethrough, and which further comprises first fitting means in the first opening through the second disc suitable for coupling hose means to the first opening through the second disc, second fitting means in the second opening through the second disc suitable for coupling hose means to the second opening through the second disc, first hose means adapted to be coupled at one end to the fitting means in the first opening through said one disc and at its other end to means for pumping liquid, a container with a high level mark and a low level mark on the walls thereof, the container having an opening through its bottom, second hose means adapted to be coupled at one end to the fitting means in the second opening through said one disc and at its other end to the opening in the bottom of the container means for covering the second fitting means to plug the second opening through the second disc, and means for covering the first fitting means to plug the first opening through the second disc.

3. Apparatus for testing a portion of a conduit comprising at least one disc having a plurality of pluggable openings therethrough, the disc having a circular channel in its curved sidewall, a first annular inflatable gasket accommodated within the disc channel, the first annular inflatable gasket filling the channel and extending outwardly therefrom when inflated, at least one annular adapter having an opening therethrough suitable for accommodating the disc such that the first annular gasket forms a seal between the disc and the adapter when inflated, said adapter having a curved outer sidewall with a circular channel therein, a second annular inflatable gasket accommodated within the adapter channel, the second annular inflatable gasket filling the channel and extending outwardly therefrom when inflated to form a seal between the adapter and the conduit.

4. Apparatus for testing a portion of a conduit according to claim 3 wherein the adapter means comprises a plurality of sections, the sections having mating interlocking means suitable for preventing liquid from flowing through the sections when the sections are interlocked.

5. Apparatus for testing a portion of a conduit according to claim 4 wherein the interlocking means comprise tongue and groove formations extending in a diametrical direction.

6. Apparatus for testing a portion of a conduit in accordance with claim 5 wherein the adapter comprises an annular front plate, a co-axial annular rear plate with an outer diameter equal to the outer diameter of the annular front plate, an annular spacer colinear to and between the front and rear plates, the annular spacer having an outer diameter less than the outer diameter of the front and rear plates whereby the adapter channel is formed, and a plurality of tie-bars passing through the front plate, the spacer, and the rear plate to hold the adapter together.

7. A method for testing a portion of a conduit by infiltration comprising the steps of blocking the downstream end of the conduit portion with a disc having an opening therethrough, measuring the time required for liquid infiltrating into the conduit portion to overflow through the disc opening, and calculating the rate of infiltration from the time measured, the distance between the opening and the invert of the conduit, and the gradient of the conduit.

8. A method for testing a portion of a conduit by infiltration in accordance with claim 7 which further comprises the step of blocking the upstream end of the conduit portion prior to the time measuring.

9. A method for testing a portion of a conduit by exfiltration comprising the steps of blocking each end of the conduit portion with suitable means, connecting means for pumping liquid into the passageway within the conduit portion through a first opening in the blocking means, connecting a container with a high level mark and a low level mark on the walls thereof to the passageway through a second opening in the blocking means, activating the pumping means so liquid flows into the passageway through the first opening, deactivating the pumping means after the liquid overflows from the passageway through the second opening and into the container when the liquid fills the container to a level above the high level mark, measuring the time required for the level of the liquid within the container to fall from the high level mark to the low level mark as liquid exfiltrates from the passageway, and obtaining the rate of exfiltration from the volume between the high level mark and the low level mark and the time measured.

References Cited

UNITED STATES PATENTS

| | | |
|---|---|---|
| 2,299,116 | 10/1942 | Svirsky. |
| 2,481,013 | 9/1949 | Henderson. |
| 2,975,637 | 3/1961 | Burdick _____ 73—40.5 XR |

LOUIS R. PRINCE, *Primary Examiner.*

J. NOLTON, *Assistant Examiner.*

U.S. Cl. X.R.

73—46; 138—90